United States Patent [19]

Bernie

[11] 4,420,082
[45] Dec. 13, 1983

[54] TAB MOUNTED DISPENSER

[75] Inventor: Jack Bernie, Edina, Minn.

[73] Assignee: Process Displays Company, North Minneapolis, Minn.

[21] Appl. No.: 414,585

[22] Filed: Sep. 3, 1982

[51] Int. Cl.³ .................... B65D 85/00; G09F 1/00
[52] U.S. Cl. ................................. 206/526; 40/11 R; 40/23 A; 206/806; 206/813; 248/205 A; 248/467; 248/221.4
[58] Field of Search ............... 206/526, 806, 813; 248/205 A, 467, 221.4; 40/11 R, 10 R, 584

[56] References Cited

U.S. PATENT DOCUMENTS 3,753,305  8/1973  Mueh .................................. 206/806
4,016,977  4/1977  Krautsack .......................... 40/11 R Primary Examiner—William T. Dixson, Jr.
Attorney, Agent, or Firm—Malcolm Reid

[57] ABSTRACT

A dispenser for a pad of advertising materials for dispensing and presentation on a one-by-one basis. The dispenser includes a hanger for supporting the sheets of advertising material. The hanger is attached to the sheets by a pivot through the sheets and the hanger so that the hanger can be rotated 180°. In a first position, the hanger is engaged with a price channel as is commonly used in retail outlets. The hanger uses a tab punched into the hanger to engage the price channel when it is in this first position. Upon rotation of the hanger on the pivot 180° to the second position, the hanger is attached to a vertical surface by an adhesive strip affixed to the rear of the hanger.

4 Claims, 7 Drawing Figures

TAB MOUNTED DISPENSER

BACKGROUND OF THE INVENTION

1. Field of the Invention

This invention relates generally to a dispenser for dispensing sheets of advertising material on a one-by-one basis as well as for the presentation to the consumer of such advertising material. In particular, this invention relates to an improvement of such a dispenser.

2. Description of Prior Art

It is common practice, especially in retail establishments, to display advertising material in high traffic flow locations to catch the attention of a large volume of potential consumers. Often times it is advantageous to provide advertising literature which the consumer can take with him. An area of high traffic flow in any retail location is in the aisles between the display shelves. Increasingly, price channels are used on each shelf so that pricing information for each product can be readily changed from time to time.

U.S. Pat. No. 4,016,977 issued on Apr. 12, 1977, and entitled Assemblage with Dual Support discloses a dispenser for presenting advertising material for taking by a consumer on a one-by-one basis. The assembly disclosed in the patent uses a pair of ears for engagement with a price channel. It has been found that the use of the ears necessitates the use of a relatively thick plastic material to avoid tearing of the support. The thick material makes it possible to snap the assemblage of U.S. Pat. No. 4,016,977 in a price channel over pricing information already in that channel because the combined thickness is greater than the flanges of the price channel will accommodate. It is a common situation where a price channel already contains pricing information which is vital to the consumer and where the advertising material that pertains to that product needs to be placed at the same point in the price channel. In such circumstances, one or the other must be eliminated. With the present invention, the increased strength of the tab over the pair of ears allows a hanger or support to be fabricated of material which is thin enough that it can be engaged in a price channel over already in place flexible plastic pricing inserts. To facilitate the utilization of both the pricing inserts and the hanger support of the present invention the flexible material used for the hanger support of the present invention is made of clear transparent material.

Another advantage of the present invention is that with the use of the tab as opposed to a pair of ears, it has been found that insertion in the price channel is simplified. With the assemblage of U.S. Pat. No. 4,016,977 it often was found that one ear would engage with the price channel, but the other would not snap into place and the assemblage would, after some use, fall out of the price channel or the engaged tab would tear due to the extra load placed on it. With the single tab of the present invention, this rarely occurs.

Another advantage of the present invention is the near elimination of accidental engagement of assemblages in their packing container. It has been found that the ears with their open slot to each side of the support would catch onto other assemblages in a box often times damaging them or even fold back on itself and tear some of its own sheets. The present invention avoids this problem by eliminating the open slits to the sides.

SUMMARY OF THE INVENTION

The present invention comprises an improvement to a support for dispensing sheet-like items from a price channel. The prior arrangements for supporting sheet-like items in the nature of advertising literature in stores, grocery super-markets and retail shops at locations of convenience and/or of high traffic flow for the purpose of catching the eye of the customer, used a pair of ears for snapping the support into the price channel as disclosed in U.S. Pat. No. 4,016,977. Although the concept of using a pair of ears to hold the support for advertising materials in a price channel was useful and helpful in these detail locations, it was soon discovered that due to the nature of the ears, the support readily tore after several customers had removed various numbers of sheets from the assemblage. The assemblage became unreliable as a result. To avoid the tearing of the ears, manufacturers of of these support arrangements were forced to use a thicker gauge flexible plastic material than would otherwise be necessary. With the thicker material it was not longer possible to place the support over numbers and other alphanumeric indicators which were already placed in the price channel. Such alphanumeric indicators are commonly used to indicate the price of a product and to provide the consumer with other information relating to the products which lie in proximity to that portion of the price channel. Not being able to place the support over existing alphanumeric indicators often times made it difficult to find space on a price channel for the advertising literature which related to a particular product. It is found to be necessary in a busy retailing outlet to have the ability to place the support in the price channel over the alphanumeric indicators already in the price channel in such a manner that they can be read through the advertising price channel support. This, therefore, also necessitated that the material used for the support be of a clear, flexible plastic material. The present invention presents an improvement over the support for dispensing sheet-like items of U.S. Pat. No. 4,016,977, by the elimination of the pair of ears. The present invention uses a single tab to lock the support into a price channel. The lower edge of the tab is spaced from the upper edge of the support a distance greater than the vertical distance between the top and bottom flanges of the price channel to lockably engage the support in the channel in a manner which is conventionally used for the placement of all alpha-numeric indicators in the price channels.

DETAILED DESCRIPTION OF THE PREFERRED EMBODIMENT

Figure 1:
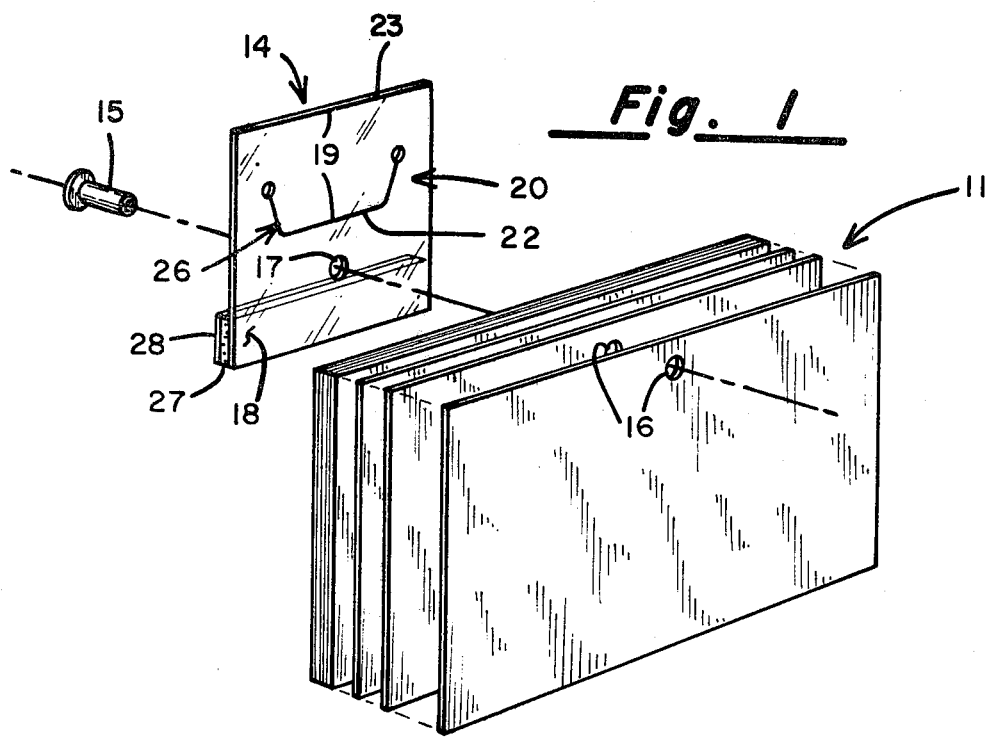
FIG. 1 is an exploded front perspective view showing an assemblage of the present invention.

This invention provides the means of supporting a plurality of advertising sheets 11 as shown FIG. 1. The advertising sheets 11 can be supported from a Price channel as shown at 12 in FIG. 2 or from a vertical surface as shown at 13 in FIG. 3. The support means or hanger 14 is attached to the plurality of sheets by a pivot 15 which in the preferred embodiment is simply a rivet which is inserted through hole 16 in the plurality of sheets 11 and then through hole 17 in the hanger 14. The rivet 15 is then flanged at the rear of hanger 14 to hold the hanger and the plurality of sheets 11 or pad of sheets and the hanger 14 together. The pin is mounted through sheets 11 and hanger 14 so that there exists a certain amount of longitudinal movement along the axis of the pin 15. This allows hanger 14 to be rotated around pin 15 as desired by the user. The hanger 14 is divided into a channel section 19 and an adhesive section 18. A horizontal line drawn through hole 17 approximates the division line between the channel section 19 and an adhesive section 18. The hanger is fabricated of a clear flat flexible plastic material such as Lexan. Lexan is a preferred material because of its resistance to tearing. The tab 20 is die cut into the channel section 19 of the hanger 14 when the hanger is initially die cut. Holes 21 are also die cut at the termination points of the tab 20 during the initial die cut of hanger 14. Holes 21 are commonly used in die cutting a slit into material such as that used for hanger 14 to eliminate any further tearing along the line of this slit. The lower edge 22 of tab 20 is parallel to the upper edge 23 of channel section 19 and spaced from the upper edge 23 of channel section 19 a distance greater than the vertical distance between the top flange 24 and the bottom flange 25 of the price channel 12. The tabl 20 has a lower edge 22 which is parallel to the upper edge 23 of hanger 14. Angular edges 26 of tab 20 extend towards the upper edge 23 of hanger 14 and outwardly from the lower edge 22 of tab 20 for a distance which does not extend to the upper edge 23 of hanger 14. The distance of extension of the angular edges 26 in the preferred embodiment is approximately one-third of the distance from the lower edge 22 of tab 20 to the upper edge 23 of hanger 14. No doubt, other distance ratios would also work satisfactorily. However, the angular edges should not extend so far upwardly that the tear resistance of the resulting hanger is reduced. Tear resistance of the hanger is a consideration, since there are many sheets on the advertising dispenser of the present invention and as they are removed one by one by potential consumers, there will be series of tugs on the hanger 14 which could eventually tear hanger 14 is angular edges 26 extend too far upward towards edge 23.

On the adhesive section 18, a strip of adhesive material 27 is placed below the rivet hole 17. A release liner 28 is placed over the adhesive material 27. The release liner 28 is not designed to shield the adhesive material 27 from accidental contact with a surface to which adhesion is not desired. When it is desired to apply adhesive 27 to a surface, the release liner 28 is easily removed without removing the adhesive 27. Adhesive 27 is a pressure sensitive adhesive of a type that is commonly and readily available in the market place. Adhesive 27 may be an adhesive directly coated onto the adhesive section 18 or it may be a section of double-faced pressure sensitive adhesive tape.

Figure 2A:
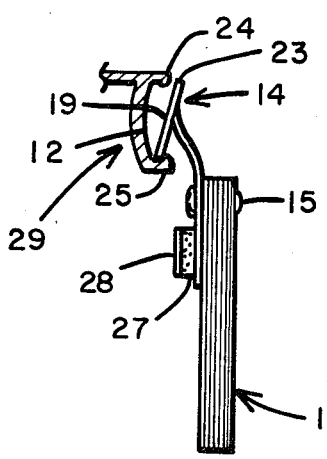
FIGS. 2a, 2b and 2c are a group of three views showing the mounting of the assemblage illustrated in FIG. 1 in a price channel.
Figure 2B:
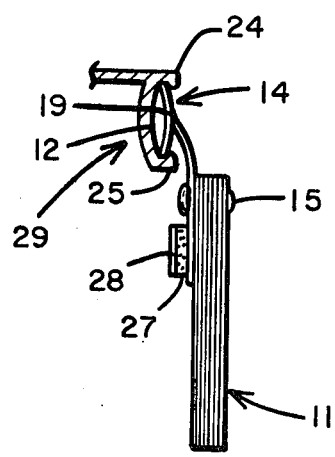
Figure 2C:
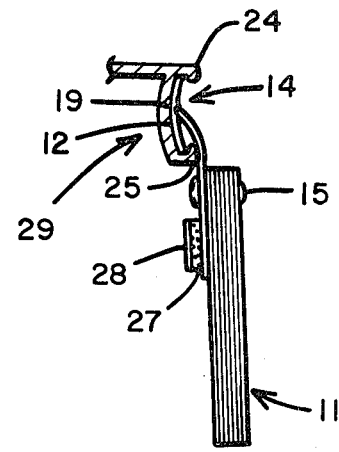

As shown IN FIG. 2, when a dispenser is desired to be used with a price channel 12, the channel section 19 is rotated around the pivot 15 so that upper edge 23 is above the advertising sheet material 11. The lower edge 22 of tab 20 is inserted in the bottom flange 25 of price channel 12. Next, the upper edge 23 of the hanger 14 is inserted into the upper flange 24 of price channel 12 in a bowed-out position. This bowed-out position results since the distance between the upper flange 24 and the lower flange 25 of price channel 12 is smaller than the distance between the lower edge 22 of tab 20 and the upper edge 23 of hanger 14. Since hanger 14 is fabricated of a flexible Lexan type material, a light pressure of the finger at a point between the lower edge 22 of tab 20 and the upper edge 23 of hanger 14 will cause that part of the channel section 19 to deflect inwards and conform to the normally concave back surface 29 of the price channel 12 thereby securely locking the hanger in place on the price channel.

Figure 3A:
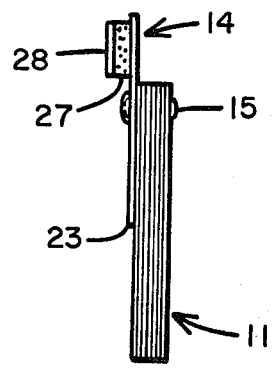
FIGS. 3a, 3b and 3c are a group of three views showing the mounting of the assemblage of FIG. 1 against a vertical surface.
Figure 3B:
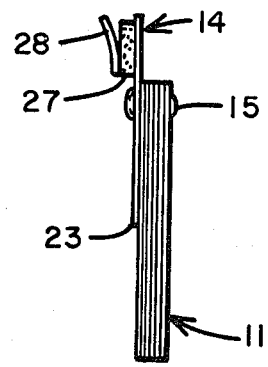
Figure 3C:
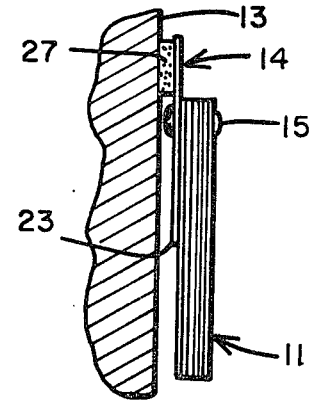

In the event that a price channel 12 is not available the hanger 14 can be rotated around pin 15 bringing the adhesive section into a position above the advertising sheet material 11. The channel section 19 is then below the sheet material 11. As shown in FIG. 3 the release liner 28 is then removed. Upon removal of the release liner 28 the dispenser with its adhesive section 18 upward is firmly pressed against a vertical surface such as a wall. The pressure sensitive adhesive 27 then adheres to the wall holding the dispenser securely in place.

Advertising sheets are then dispensed from the dispenser simply by the user tearing one of the sheets off of the pivot 15. Alternatively, pivot 15 could be placed only through the film backing behind the pad of advertising tear sheets. The advertising tear sheets would be affixed to the film backing by padding compound which is commonly painted on the top surfaces of the advertising sheets and the top surface of the film back.

So that the hanger 14 can be placed in a price channel 12 over pricing information which is already in the channel it is found that the thickness of the flexible plastic material used for the hanger should be no greater than 0.015 inches. The flexible material should also be transparent so that the pricing information can be seen through it. It is found that it in increasingly necessary to be able to place the advertising material over existing pricing information since the competition for shelf space and, thereby, for space on the pricing channel 12 is at a premium in an active retail location.

The pivot 15 and the pivot hole 17 and hanger 14 is located at a point below the tab 20. The hole 16 in the plurality of sheets 11 is located at the horizontal center of the plurality of sheets 11. If the hole 16 in the plurality of sheets 11 would not be located at the horizontal center, the sheets 11 would hang from a hanger 14 at an angle which would be cosmetically displeasing.

What is claimed is:

1. A dispenser for presentation and taking of a plurality of sheets on a one-by-one basis comprising:
   (1) a plurality of sheets;
   (2) a hanger for supporting the plurality of sheets from a price channel having top and bottom flanges or against a vertical surface, the hanger (a) fabricated of flat flexible material, (b) having a channel section and an adhesive section, the channel section having a tab, the lower edge of the tab extending in a straight line parallel to the upper edge of the channel section and spaced from the upper edge of the channel section a distance greater than the vertical distance between the top and bottom flanges of the price channel, (c) the hanger having pressure sensitive adhesive on the rear surface of the adhesive section and having a release liner covering the adhesive;
   (3) a pivot linking the plurality of sheets and the hanger, the pivot being connected to the hanger at a point below the tab and being connected to the plurality of sheets at a point along a vertical line which line divides the plurality of sheets into two equal halves so that the hanger can be pivoted from a first position where the channel section is uppermost and the lower edge of the tab and the upper edge of the channel section can be engaged with the price channel to support the plurality of sheets, to a second position where the adhesive section is uppermost and the adhesive can attach the hanger to a vertical surface to support the plurality of sheets.

2. A dispenser in accordance with claim 1 wherein the hanger is fabricated of clear, transparent flat flexible material.

3. A dispenser in accordance with claim 1 wherein the hanger is fabricated of a material with a thickness which does not exceed 0.015 inches.

4. A dispenser in accordance with claim 2, wherein the material is hexan.

* * * * *